Patented Nov. 28, 1950

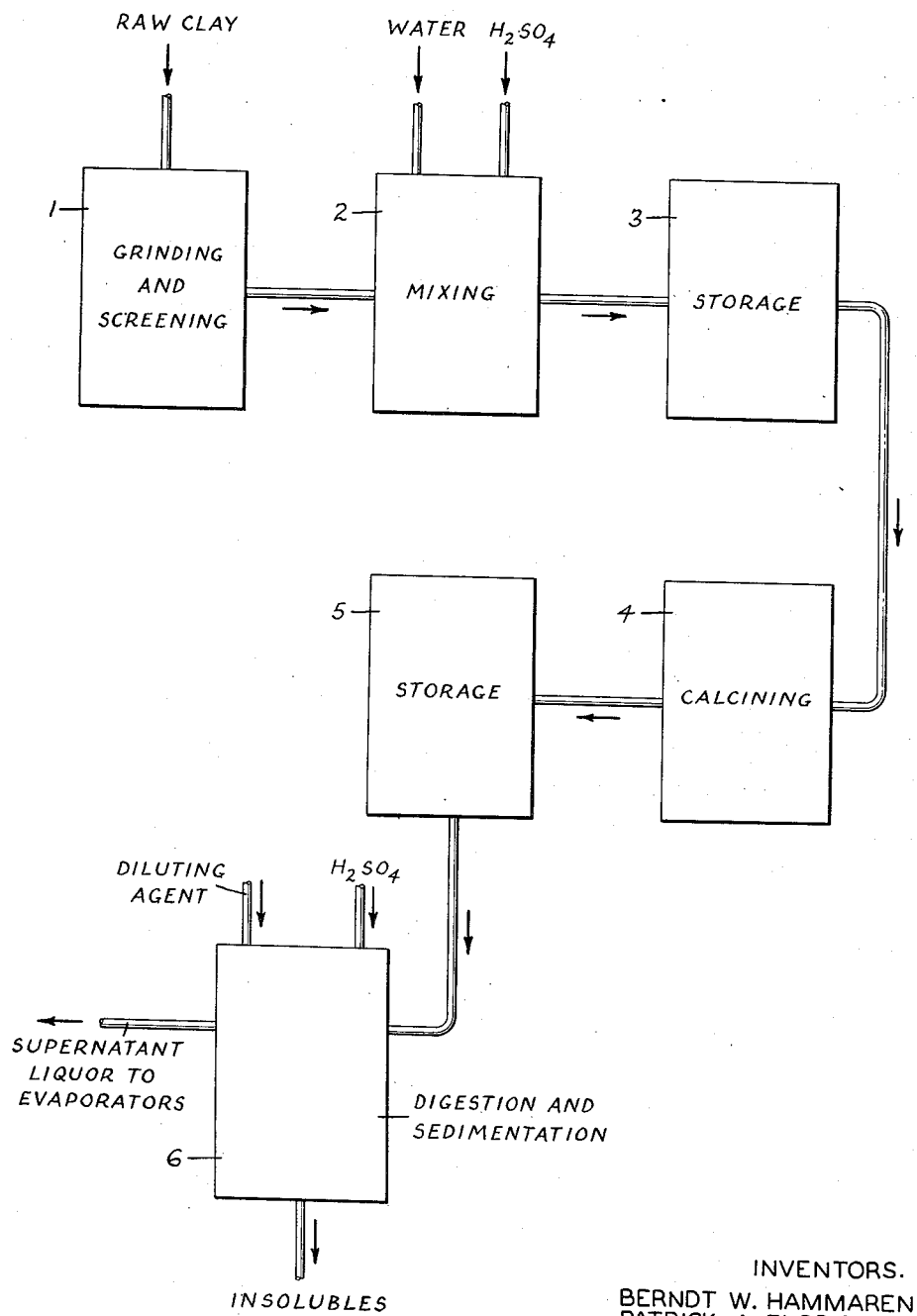

2,531,978

UNITED STATES PATENT OFFICE 2,531,978

CONDITIONING CLAY FOR MANUFACTURE OF ALUMINUM SULFATE

Berndt Waldemar Hammarén, Mineola, N. Y., Patrick Anthony Florio, Wilmington, Del., and Robert Vose Townend, Arlington, N. J., assignors to Allied Chemical & Dye Corporation, New York, N. Y., a corporation of New York Application December 30, 1949, Serial No. 135,892

7 Claims. (Cl. 23—123)

This invention relates to the production of aluminum sulfate and more particularly refers to a new and improved method of conditioning clay for the manufacture of aluminum sulfate.

A conventional practice of manufacturing aluminum sulfate involves grinding and calcining clay followed by digesting the ground calcined clay with sulfuric acid in a tank. After effecting conversion of the clay to aluminum sulfate the reaction mixture is diluted to about 30° Bé. and the insolubles referred to as digest mud permitted to settle until the height of the mud level drops to about 35% or less of the total column of reaction mixture. Clear supernatant liquor is withdrawn through stand pipes and concentrated to alum cake strength.

Not all clays are commercially suitable for the manufacture of aluminum sulfate. A class of clays referred to in the industry as hard bond or flint is currently successfully processed for the production of aluminum sulfate. Softer grades of clays, such as kaolins and soft bond clays, were found to be uneconomical of use due to their inherently por settling properties. These latter clays have poor structrual strength, breaking down excessively during grinding and subsequent digestion with acid, with the result that settling of insolubles, much being in the form of extremely small particles, becomes unduly slow, thus seriously reducing the rate of plant production. With the depletion of the hard bond type clays, it becomes increasingly important to develop means for successfully processing clays of the soft bond type.

An object of the present invention is to provide an improved process for reducing the settling time in the manufacture of aluminum sulfate from clays.

Another object of the invention is to provide an improved method of conditioning clay for manufacture of aluminum sulfate.

A further object of the present invention is to provide an improved method of treating clay for the production of aluminum sulfate, whereby the clay is more resistant to deterioration into fines and susceptible to rapid settling.

A still further object is to provide a process for commercially, economically converting soft bond clays into aluminum sulfate.

Other objects and advantages of the present invention will become apparent from the following description and accompanying drawing.

We have found that the water content of clay prior to calcination has a marked effect on the settling rate of the digest mud. While we cannot give any proven explanation for this action, our experiments indicate the addition of controlled amounts of water to clay particles prior to calcination are effective in agglomerating the colloidal particles with the result that the rate of subsequent settling is much improved.

A preferred method of carrying out this portion of our invention involves grinding the raw clay to fineness desired, such as about 20 mesh, then admixing a predetermined amount of water with the clay such that the admixed clay will contain from 5 to 25% moisture by weight of the clay as measured by drying at 110° C. to constant weight, aging the mass for at least 15 minutes, to permit the moisture to be thoroughly dispersed and to agglomerate the clay particles, calcining the wet clay, digesting the clay with sulfuric acid, diluting the digest, settling the mud, and withdrawing the supernatant liquor.

We have also found that the hard bond or flint type of clays do not require as much moisture as the soft bond and kaolin types. The preferred percentages of moisture for the hard bond type is 5 to 15% with 15 to 25% moisture for the soft bond type clays.

In the commercial practice of preparing clays for sulfation it is common to pretreat the clays near the pits, that is grind and calcine the clay at the location where the clay is mined and then transport the ground calcined clay to central aluminum sulfate plants for digestion with sulfuric acid. Softer grade clays, even though treated with controlled amounts of moisture, have a tendency to revert to their poor settling condition unless very carefully handled which, as a practical matter, is virtually impossible, because attrition always occurs in transporting the pretreated clay from one location to another. Also, since the softer clays have poor strength characteristics both before and after calcination, appreciable deterioration into fines occurs in the calciner even before shipment.

We have discovered that the addition of small amounts of sulfuric acid to the clay, preferably between 1 to 5% $H_2SO_4$ expressed as 100% $H_2SO_4$ by weight of the clay, prior to calcination, unexpectedly imparts sufficient strength to the clay to resist breaking apart during calcination and ordinary handling so that the improved setting is not changed.

A preferred method of carrying out the operation in accordance with the present invention involves grinding raw clay to the desired particle size and then gradually adding an aqueous sulfuric acid solution while intimately mixing the clay and solution, avoiding lump formation during the mixing. The amount of solution and concentration of sulfuric acid in the solution added to the clay during the mixing should be adjusted so that the moistened clay will contain from 5 to 25% water and from 1 to 5% $H_2SO_4$. The ground wet clay is then allowed to stand without further treatment for at least 15 minutes and the aged clay then calcined in suitable apparatus. The ground calcined clay is digested with sulfuric acid in large tanks and then diluted with aluminum sulfate solution recovered from a previous operation to about 30° Bé. After settling, the clear supernatant liquor is directed to evaporation pans where it is concentrated to aluminum sulfate cake.

The accompanying drawing is a flow sheet illustrating the process of the present invention. The charging material consisting of raw clay is subjected to grinding and screening operations 1 which may be accomplished in conventional apparatus such as roller and hammer mills with screen separation. Although the size of the clay particles will vary to some extent dependent upon the nature of the clay, good results were obtained by grinding clay to approximately 20 mesh. Clay of the desired fineness from the grinding and screening operations 1 passes into mixer 2 wherein controlled amounts of water and a small amount of $H_2SO_4$ are added slowly while mixing the clay to prevent formation of lumps as much as possible. Mixing devices of the paddle type may satisfactorily be employed for this purpose. As previously stated the amount of water to be added to the clay should be regulated so that the water content of the clay, as determined by drying at 110° C. to constant weight, will be within the limits of 5 to 25% by weight of the clay. Clays of the hard bond type require only 5 to 15% water, whereas best results are obtained by using 15 to 25% water with clays of the soft bond type. The quantity of $H_2SO_4$ admixed with the clay may vary from 1 to 5% by weight of the clay using 100% $H_2SO_4$ as a base. Although the drawing shows the separate introduction of water and $H_2SO_4$ into mixing device 2, as a practical matter, a dilute aqueous sulfuric acid solution may be first prepared and introduced as a single stream into the mixer. By limiting the amount of moisture to 25% or less we avoid forming clay slurries and impart to the clay particles just sufficient moisture to increase their plasticity but without their becoming unduly sticky with a tendency to form clusters. The action of a small amount of sulfuric acid in some manner unknown to us imparts structural strength to the particle bodies.

The moistened acid treated clay particles from mixing device 2 are directed to storage bins or hoppers 3, and then subjected to heat treatment in calcining operation 4. A period of at least 15 minutes should elapse between mixing and calcining to permit the moist acid treated clay to age. Longer periods of time while not detrimental do not appear to have any beneficial effect. Calcination may be accomplished by heating the clay to a temperature between 1000° and 1600° F. in a rotary kiln commonly used for that purpose. Calcination not only removes organic impurities in the clay by burning them but also converts the alumina content in the clay to a physical state where it will be more readily reacted upon by sulfuric acid in the subsequent digestion. During the calcination, particularly in rotary calciners, the clay particles move about rubbing against each other and against the walls of the kiln. Unless the particles are structurally strong bodies, this abrasion will induce considerable formation of fines of colloidal and near colloidal size with consequent impairment of settling rate following digestion with sulfuric acid. A particular advantage of the present invention resides in the creation of structurally strong clay bodies resistant to erosion, thereby minimizing deterioration into fines.

As a precautionary measure any over-size particles leaving mixing device 2 or calcining kiln 4 may be separated by screening through a 10 mesh screen and, if desired, the over-size particles ground and commingled with the particles separated therefrom.

Ordinarily clay from calciner 4 is placed in storage bins 5 to be used as the charging material in digesters located on the grounds adjacent the clay pits or shipped to a central aluminum sulfate plant. The digestion procedure as conventional in the art consists simply in introducing sulfuric acid having a concentration of 42% to 48% acid based on 100% $H_2SO_4$ and adding calcined clay to the acid solution. In general the ratio of 100 pounds to 133 pounds of 100% acid are reacted with 100 pounds of clay. The digestion tank 6 is customarily a vertical tank approximately 12 feet high and 15 feet in diameter. A charge to the tank usually consists of about 45,000 pounds of 48% acid and 20,000 pounds of calcined clay. For most clays presently commercially utilized completion of digestion occurs in 1 to 4 hours.

It becomes necessary to dilute the reaction products in tank 6 in order to dissolve the aluminum sulfate therein and to permit sedimentation of the insoluble matter. The greater the dilution the more readily settling of the solids will occur. However, too great a dilution is uneconomical because it places a burden of evaporating large quantities of water from the liquor in order to obtain aluminum sulfate cake. From long experience it has been found advisable to dilute the reaction products to approximately 30° Bé. Gravities appreciably higher than this retard settling and gravities appreciably lower unduly dilute the aluminum sulfate solution. With certain clays more rapid and complete digestion of the clay may be accomplished by adding the clay in two stages, as for example, the addition of 75% of the calculated amount of the clay at the start of the digestion and the rest of the clay after a short period of about 1½ hours.

Water may be added to the digest for purposes of diluting the reaction products, but for economy it is advisable to employ dilute aluminum sulfate solution recovered from previous operations. After dilution the contents in tank 6 are permitted to rest until the digest mud settles to a level approximately 32% of the height of the total contents which in the case of a vessel 12 feet high would be about 40 inches. The digestion tanks are the "bottleneck" of the operation and the capacity of the process is limited by the time consumed in accomplishing digestion and particularly separation of mud from liquor. The settling time in present day commercial practice when utilizing hard bond clays varies from 1 to 20 hours dependent upon, of course, the nature of the clay and the conditions of operation. Softer, lower grade clays frequently have been found to require over 24 hours to obtain separation of the mud to the same degree. This low rate of settling reduces the capacity of the plant to such an extent that low grade clays cannot ordinarily be used in the commercial production of aluminum sulfate. Of course, a greater number of settling tanks may be employed, but this would appreciably increase the investment, operating and maintenance costs.

When the sediment in tank 6 has dropped to a sufficiently low level, clear supernatant liquor containing dissolved aluminum sulfate is withdrawn and sent to evaporators of conventional design for the removal of moisture and the production of alum in cake form. Water is added to the mud remaining in tank 6 until the Baumé is about 10° whereupon rapid settling of the insolubles occurs and the clear liquid is withdrawn, stored and utilized as a diluent in the next operation. The solids remaining in tank 6 are removed, making the digestion tank available for another charge of sulfuric acid and calcined clay.

The following examples illustrate the present invention:

Example 1

100 parts of a soft bond clay derived from a Smith Skornia pit in Missouri was ground and screened to about 20 mesh size, placed in a paddle mixer and over a period of about 30 minutes 25 parts by weight of an aqueous 20% $H_2SO_4$ solution gradually added while mixing. Mixing was continued for an additional 30 minutes to effect intimate admixture with the liquid. The moist clay was removed from the mixer and screened through 10 mesh, the small amount of over-size particles then ground to 20 mesh and added to the other portion of clay. After allowing the admixed clay to age for 30 minutes it was transferred to a rotary calciner wherein it was maintained at 1200° F. for one hour. The calcined clay was then added during a two-hour period to 200 parts by weight of 48% $H_2SO_4$ in a vertical digestion tank. An additional hour and a half was required to complete digestion. A 10° Bé. aluminum sulfate solution was then added to the reaction mixture in the tank until the liquor was reduced to about 30° Bé. Settling of the digest mud to a 35% level based on the height of the digest mud relative to the height of contents in the digester tank occurred in less than one hour. Slightly more than 2 hours elapsed before the level was reduced to 30% mud.

For comparative purposes another batch of the Smith Skornia clay was processed in a manner similar to that described above with the exception that the addition of the 20% aqueous sulfuric acid solution prior to calcination was omitted. The settling times after digestion to obtain a 35% mud was about 24 hours and to obtain a 30% mud was over 30 hours.

Example 2

Two similar tests with and without conditioning the clay as described in Example 1 above when treating a soft bond clay obtained from a Nebelsick pit in Missouri gave the following results:

|  | Comparative Settling Time to— | |
|---|---|---|
|  | 30% mud | 25% mud |
|  | Hours | Hours |
| Conditioning of clay with 20% $H_2SO_4$ | 1 | 4 |
| Without addition of 20% $H_2SO_4$ | >24 | >32 |

In order to demonstrate the improvement in structural strength of the clay particles due to the use of small amounts of sulfuric acid during conditioning of the clay, tests were made wherein water in the absence of sulfuric acid was used as a conditioning agent and comparative tests wherein dilute aqueous sulfuric acid was used as a conditioning agent. The clays employed for this purpose were derived from Nebelsick pit and Smith Skornia pit as in Examples 1 and 2 above. The results of these tests are shown in the following table in which comparative crushing strengths were measured as the gram pressure required to crush particles of 1.5 to 2.0 mm. diameter:

|  | Crushing Strength | |
|---|---|---|
|  | Conditioned With $H_2O$ alone | Conditioned With 20% $H_2SO_4$ |
| Nebelsick Clay before calcination | 70 | 510 |
| Nebelsick Clay after calcination | 260 | 630 |
| Smith Skornia before calcination | 65 | 470 |
| Smith Skornia after calcination | 180 | 650 |

Numerous other clays when treated in accordance with the procedure outlined in Example 1 above give settling times required to bring the digest mud to a 32% level as summarized in the following tabulation:

| Clay | Percent 20% $H_2SO_4$ added for Conditioning clay | Settling Time in Hours of Conditioned Clay | Settling Time in Hours of Clay Without Water and Acid Conditioning |
|---|---|---|---|
| Missouri (soft bond) | 25 | 3 | >60 |
| Vanderbilt Kaolin | 25 | <1 | >50 |
| Georgia Underlying Kaolin | 25 | <1 | >24 |
| Missouri (soft-hard bond) | 15 | <1 | 3 |
| Missouri #1 (hard bond) | 15 | <1 | 3 |
| Missouri Fahrenberg (white flint) | 10 | <1 | 1 |
| Georgia Average Chimney Rock | 10 | <1 | 1.5 |
| Missouri #2 (hard bond) | 10 | <1 | 2.5 |
| Missouri #3 (hard bond-flint) | 10 | <1 | 3 |
| Missouri (grey flint) | 5 | <1 | 1 |

From the foregoing comparative results it will be observed that the greatest improvement in settling time is obtained when utilizing kaolin or soft bond clays, and it should be noted that improvement in settling time is also obtained, but to a lesser extent when conditioning hard bond clays in accordance with the present invention.

It is evident that the advantages of our method of clay treatment may be utilized in other aluminum sulfate manufacturing processes, such as, for example, a process in which filtration of the aluminum sulfate digest liquor is carried out to separate insoluble material from aluminum sulfate liquor instead of the settling operation above described.

Although certain preferred embodiments of the invention have been disclosed for purpose of illustration it will be evident that various changes and modifications may be made therein without departing from the scope and spirit of the invention.

We claim:

1. A process for the production of aluminum sulfate from clay which comprises grinding the clay, admixing a predetermined amount of water and sulfuric acid with the ground clay such that the admixed clay will contain from 5 to 25% water and 1 to 5% H₂SO₄ by weight of the clay, aging the mass for at least 15 minutes, calcining the moist acid treated clay, digesting the clay with sulfuric acid, and separating aluminum sulfate liquor from insoluble material in the reaction products.

2. A process for the production of aluminum sulfate from clay which comprises grinding the clay, admixing a predetermined amount of water and sulfuric acid with the ground clay such that the admixed clay will contain from 5 to 25% water and 1 to 5% H₂SO₄ by weight of the clay, aging the mass for at least 15 minutes, calcining the moist acid treated clay, digesting the clay with sulfuric acid, diluting the digest, settling the digest mud and withdrawing the supernatant liquor containing dissolved aluminum sulfate.

3. A process for the production of aluminum sulfate from soft-bond and kaolin type clay which comprises grinding the clay, admixing a predetermined amount of water and sulfuric acid with the ground clay such that the admixed clay wil contain from 15 to 25% water and 1 to 5% H₂SO₄ by weight of the clay, aging the mass for at least 15 minutes, calcining the moist acid treated clay, digesting the clay with sulfuric acid, diluting the digest, settling the digest mud and withdrawing the supernatant liquor containing dissolved aluminum sulfate.

4. A process for the production of aluminum sulfate from hard bond and flint type clay which comprises grinding the clay, admixing a predetermined amount of water and sulfuric acid with the ground clay such that the admixed clay will contain from 5 to 15% water and 1 to 5% H₂SO₄ by weight of the clay, aging the mass for at least 15 minutes, calcining the moist acid treated clay, digesting the clay with sulfuric acid, diluting the digest, settling the digest mud and withdrawing the supernatant liquor containing dissolved aluminum sulfate.

5. A process for the production of aluminum sulfate from soft bond and kaolin type clay which comprises grinding the clay to about 20 mesh, gradually adding water and sulfuric acid while intimately mixing with the ground clay and avoiding lump formation during the mixing, such that the admixed clay will contain from 15 to 25% water and 1 to 5% H₂SO₄ by weight of the clay, aging the mass for at least 15 minutes, calcining the clay at a temperature between 1000° and 1600° F., digesting the calcined clay with 42 to 48% sulfuric acid in an enlarged zone, adding a dilute aluminum sulfate solution to the digest in an amount sufficient to reduce its gravity to approximately 30° Bé., settling the diluted reaction products until the digest mud settles to a level which is less than 35% of the height of the total mixture, withdrawing clear supernatant liquor containing dissolved aluminum sulfate, adding water to the digest mud, settling the insolubles and separating the dilute aluminum sulfate solution from the insolubles.

6. A process for the production of aluminum sulfate from hard bond and flint type clay which comprises grinding the clay to about 20 mesh, gradually adding water and sulfuric acid while intimately mixing with the ground clay and avoiding lump formation during the mixing, such that the admixed clay will contain from 5 to 15% water and 1 to 5% H₂SO₄ by weight of the clay, aging the mass for at least 15 minutes, calcining the clay at a temperature between 1000° and 1600° F., digesting the calcined clay with 42 to 48% sulfuric acid in an enlarged zone, adding a dilute aluminum sulfate solution to the digest in an amount sufficient to reduce its gravity to approximately 30° Bé., settling the diluted reaction products until the digest mud settles to a level which is less than 35% of the height of the total mixture, withdrawing clear supernatant liquor containing dissolved aluminum sulfate, adding water to the digest mud, settling the insolubles and separating the dilute aluminum sulfate solution from the insolubles.

7. In a process for the production of aluminum sulfate involving grinding and calcining clay followed by digesting the ground calcined clay with sulfuric acid and settling of the digest mud, the improvement which comprises conditioning the clay prior to calcination by admixing a predetermined amount of water and sulfuric acid with the clay such that the admixed clay will contain from 5 to 25% water and 1 to 5% H₂SO₄ by weight of the clay.

BERNDT WALDEMAR HAMMARÉN.
PATRICK ANTHONY FLORIO.
ROBERT VOSE TOWNEND.

No references cited.